United States Patent [19]

Torii

[11] Patent Number: 5,109,944
[45] Date of Patent: May 5, 1992

[54] FOUR WHEEL-DRIVE SYSTEM WITH VISCOUS COUPLING

[75] Inventor: Shuji Torii, Yokohama, Japan

[73] Assignee: Nissan Motor Co., Ltd., Yokohama, Japan

[21] Appl. No.: 513,036

[22] Filed: Apr. 23, 1990

Related U.S. Application Data

[63] Continuation of Ser. No. 235,625, Aug. 24, 1988, abandoned.

[30] Foreign Application Priority Data

Sep. 7, 1987 [JP] Japan ............................ 62-136619[U]

[51] Int. Cl.$^5$ ............................................. B60K 17/34
[52] U.S. Cl. .................................. 180/248; 74/665 T; 475/198; 475/248
[58] Field of Search ............... 180/248, 247, 233; 74/665 T; 475/198, 248; 192/58 B

[56] References Cited

U.S. PATENT DOCUMENTS

| | | | |
|---|---|---|---|
| 2,648,236 | 8/1953 | Wilson | 475/248 |
| 2,871,724 | 2/1959 | Dence | 180/248 |
| 3,401,763 | 9/1968 | Rolt | 475/198 |
| 4,714,129 | 12/1987 | Mueller | 180/247 |
| 4,739,678 | 4/1988 | Miura et al. | 74/665 T |
| 4,757,870 | 7/1988 | Torii et al. | 180/233 |
| 4,848,507 | 7/1989 | Masuda et al. | 180/248 |

FOREIGN PATENT DOCUMENTS

| | | | |
|---|---|---|---|
| 3533143 | 5/1987 | Fed. Rep. of Germany | |
| 163828 | 7/1987 | Japan | 180/248 |
| 163829 | 7/1987 | Japan | 180/248 |

OTHER PUBLICATIONS

Service Bulletin No. 553, "Nissan Pulser", Introduction to N13 type vehicle, published by Nissan Motor Co., Ltd. May, 1986, pp. C-23-26.

Primary Examiner—Mitchell J. Hill
Attorney, Agent, or Firm—Foley & Lardner

[57] ABSTRACT

A four-wheel drive system comprises a first drive train that is mechanically engageable for transmitting a driving force from an engine to a set of front wheels and a second drive train that is provided with a viscous coupling for transmitting a driving force from the engine to a set of rear wheels by way of the viscous coupling. The second drive train is constructed so as to satisfy the relation that the speed of rotation of an input shaft of the viscous coupling divided by the speed of rotation of the front wheels is larger than the result of the speed of rotation of an output shaft of the viscous coupling divided by the speed of rotation of the rear wheels.

4 Claims, 2 Drawing Sheets

TORQUE TRANSMISSION CHARACTERISTIC
OF VISCOUS COUPLING

FOUR WHEEL-DRIVE SYSTEM WITH VISCOUS COUPLING

This application is a continuation of application Ser. No. 07/235,625, filed Aug. 24, 1988 now abandoned.

BACKGROUND OF THE INVENTION

1. Field of the Invention

The present invention relates in general to drive trains for automotive vehicles and more particularly to a four-wheel drive system equipped with a viscous coupling.

2. Description of the Prior Art

An example of a prior art four-wheel drive system is adapted to transmit a driving force from an engine to a set of front wheels through a mechanically engaged drive train therebetween and to a set of rear wheels by way of a viscous coupling in such a way that the driving force is distributed to the front and rear wheels based on the difference in rotation between the input and output shafts of the viscous coupling for thereby making the distribution of the driving force comply with the road surface and driving conditions.

The prior art four-wheel drive system is constructed so that the speeds $N_i$, $N_o$ of rotation of the input and output shafts of the viscous coupling are equal to each other when the speeds $N_f$, $N_r$ of rotation of the front and rear wheels are equal to each other and that the difference $\Delta N_{io}$ ($=N_i - N_o$) in speed of rotation between the input and output shafts of the viscous coupling is caused in response to the difference $\Delta N_{fr}$ ($=N_f - N_r$) in speed of rotation between the front and rear wheels. The drive system thus effects a two-wheel drive mode of operation unless there is any difference $\Delta N_{fr}$ in speed of rotation between the front and rear wheels, resulting in a tendency that a driving force distributed to the rear wheels is smaller than that to the front wheels.

When the drive system is in a two-wheel drive mode of operation, a relation of $N_f > N_r$ exists since the front wheels slips a small amount. As a result, a driving force proportional to the difference $\Delta N_{fr}$ in speed of rotation between the front and rear wheels as represented by the dotted lines in FIG. 3 is distributed to the rear wheels. However, since the difference $\Delta N_{fr}$ is so small, a driving force $F_f$ distributed to the front wheels is far larger than that $F_r$ to the rear wheels except some particular moments.

Due to this, the prior art drive system effects a responsive delay when responding to a positive difference $\Delta N_{fr}$ in speed of rotation between the front and rear wheels (the positive difference arises when the speed of rotation of the front wheels which are always driven is higher than that of the rear wheels) for changing the driving mode of operation from the two-wheel drive mode to the four-wheel drive mode and thereby improving the acceleration efficiency at starting, the straight running stability and driveability on a slippery road.

Further, at the time of braking which makes the difference in speed of rotation between the front and rear wheels, $\Delta N_{fr}$ is negative and the front wheels tend to lock, the driving force is transmitted to the front wheels to improve braking efficiency. However, at this time, a high braking torque is transmitted to the rear wheels by an action of the drive system reverse to that effected when there is a positive difference $\Delta N_{fr}$ in speed of rotation between the front and rear wheels. Due to this, the rear wheels tend to lock on engine braking during running on a slippery descending road and with foot braking, resulting in a poor, unreliable braking stability.

SUMMARY OF THE INVENTION

In accordance with the present invention, there is provided an improved four-wheel drive system which comprises a power unit and means for transmitting a power from said power unit to a set of front wheels through a mechanically engaged drive line and to a set of rear wheels through a drive line having a viscous coupling.

The means is constructed so that the result of the speed of rotation of an input shaft of said viscous coupling divided by the speed of rotation of said front wheels is larger than the result of the speed of rotation of an output shaft of said viscous coupling divided by the speed of rotation of the rear wheels.

This structure is effective for overcoming the above noted shortcomings and disadvantages inherent in the prior art devide.

It is accordingly an object of the present invention to provide an improved four-wheel drive system which can improve the acceleration efficiency at starting, the straight running stability, the driveability on a slippery road, etc.

It is another object of the present invention to provide an improved four-wheel drive system of the above described character which can prevent the rear wheels from locking on braking even when the braking tends to lock the front wheels, whereby to improve the braking stability.

It is a further object of the present invention to provide an improved four-wheel drive system of the above described character which can improve the responsiveness for changing the mode of operation.

It is a further object of the present invention to provide an improved four-wheel drive system of the above described character which is of a great practical usefulness though simple in structure.

DESCRIPTION OF THE PREFERRED EMBODIMENT

Figure 1:
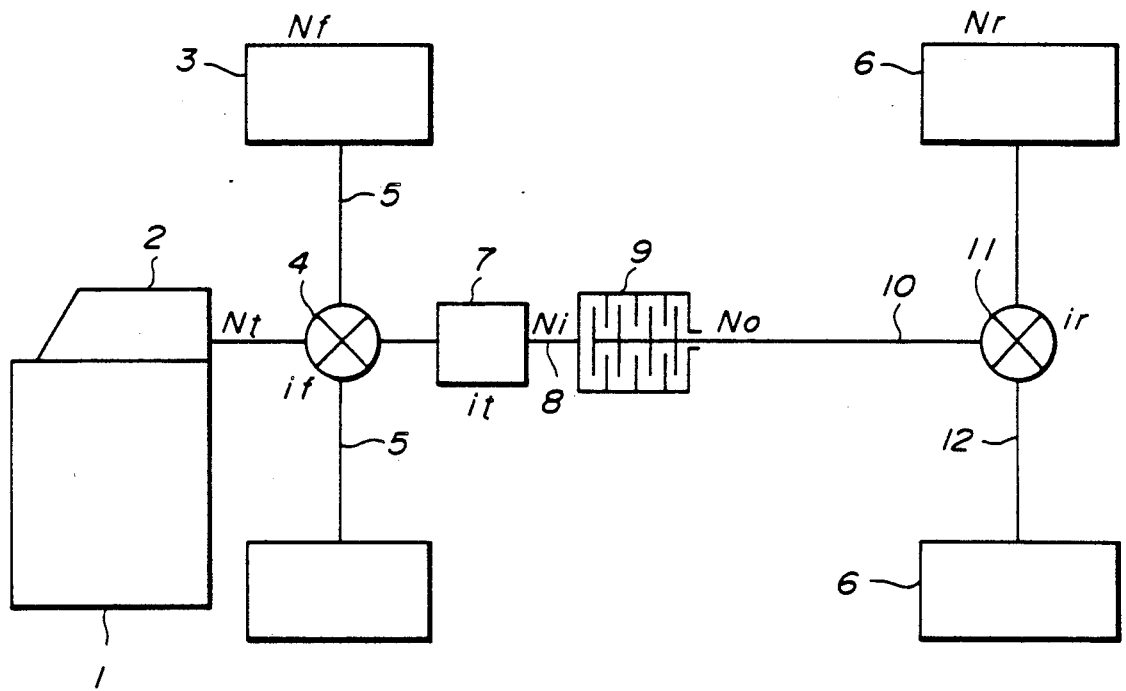
FIG. 1 is a diagrammatic view of a drive train of a four-wheel drive system equipped with a viscous coupling according to an embodiment of the present invention.

Referring to the drawings, a four-wheel drive system of the present invention is shown as comprising a mechanically engageable and disengageable front drive train for transmitting a driving force from an engine 1 and a transmission 2 to a set of front wheels 3, 3. The front drive train includes a front differential 4 and a set of front drive axles 5, 5. The four-wheel drive system further comprises a rear drive train for transmitting a driving force from the front differential 4 to a set of rear wheels 6, 6. The rear drive train includes a speed-up mechanism 7, a viscous coupling input shaft 8, a viscous coupling 9, a viscous coupling output shaft 10, a rear differential 11 and a set of rear drive axles 12, 12.

Figure 2:
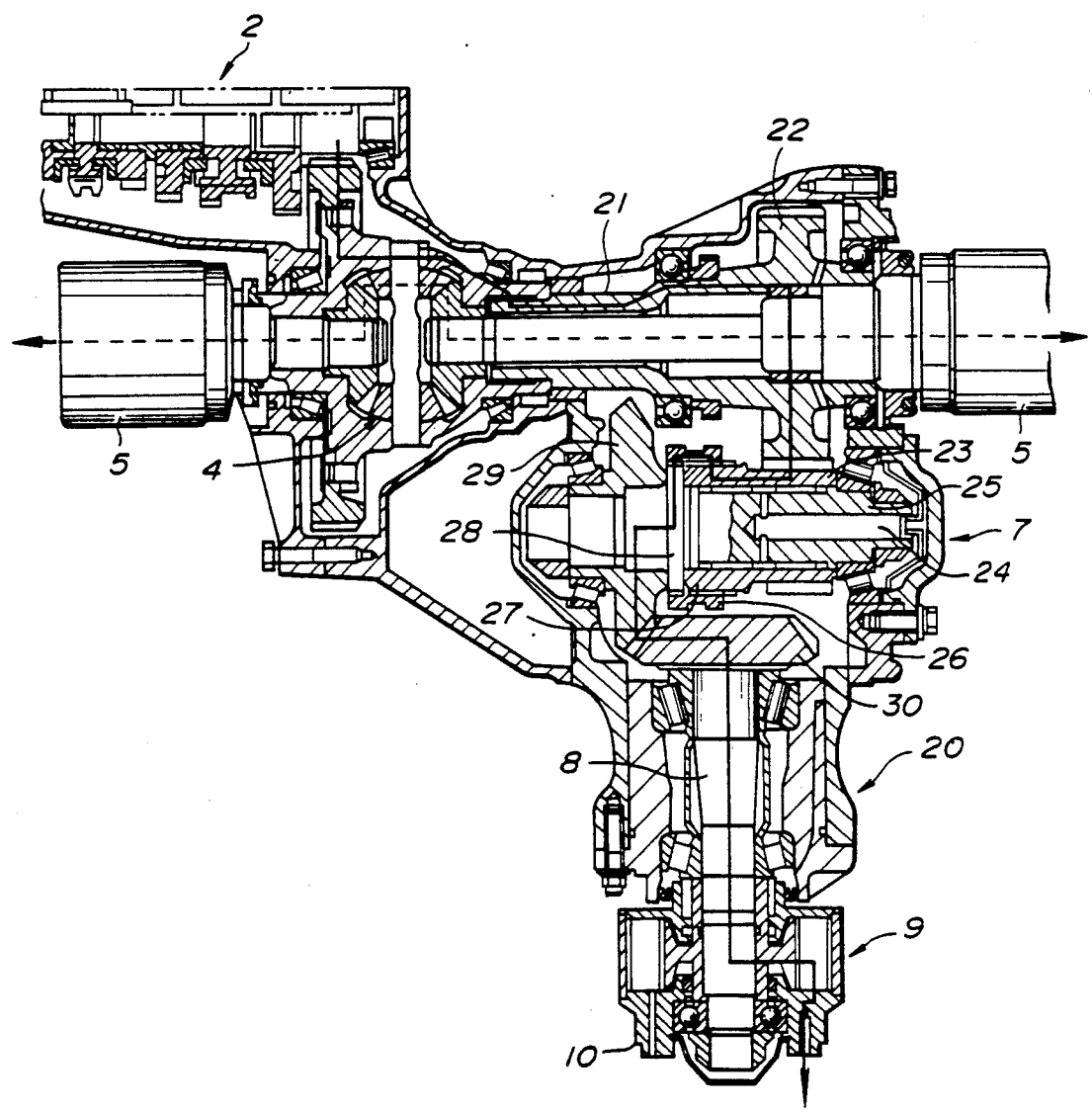
FIG. 2 is a sectional view of a principal portion of the four-wheel drive system of FIG. 1.

The portion of the rear drive train where the speed-up mechanism 7 and the viscous coupling 9 are disposed is constructed as shown in detail in FIG. 2 wherein the speed-up mechanism 7 is encased in the transfer case 20 and includes a ring gear shaft 21, ring gear 22, counter gear 23, counter gear shaft 24, counter shaft 25, coupling sleeve 26, sleeve gear 27, shift gear 28, hypoid gear 29 and a drive gear 30.

The viscous coupling 9 consists of a number of alternate outer and inner plates and silicone oil of a high viscosity.

Now assuming that a gear ratio of the front differential 4 is i f, a gear ratio of the multiplying gear 7 is i t, a gear ratio of the rear differential 11 is i r and a transmission output rpm is N t, the speed of rotation of the front wheels N f is given by $$N f = (1/i\ f) \cdot N t$$

The speed N i of rotation of the coupling input shaft 8 is given by $$N i = 1/(i\ f \cdot i\ t) \cdot N t.$$

The speed N r of rotation of the rear wheels 6, 6 is given by $$N r = (1/i\ r) \cdot N o$$

where N o is the speed of rotation of the viscous coupling output shaft 10.

Accordingly, the result of the speed N i of rotation of the coupling output shaft 10 divided by the speed N f of rotation of the front wheels 3, 3 is (1/i t) whilst the result of the speed N o of rotation of the coupling output shaft 10 divided by the speed N r of rotation of the rear wheels 6, 6 is ( i r ).

In accordance with the present invention, the drive system is constructed so that (1/i t )>( i r ), that is, 1>i r·i t in order to obtain the relation of (N i/N f)>(N o/N r). More specifically, the above relation is obtained by suitably setting one of or both of the gear ratios i t , i r of the speed-up mechanism 7 and the differential 11 respectively, which are the mechanical power transmitting parts or elements provided in the drive train.

The four-wheel drive system of the present invention operates as follows:

In the viscous coupling equipped vehicle, one of or both of the gear ratios i t, i r of the speed-up mechanism 7 and the rear differential 11 respectively, are set so as to satisfy the relation 1>i r i t. By this effect, when the speed N f of rotation of the front wheels 3, 3 is high, the difference ΔN io in speed of rotation between the input and output shafts 8, 10 of the viscous coupling 9 is larger than the difference ΔN fr in speed of rotation between the front and rear wheels 6, 6. On the contrary, when the speed N r of rotation of the rear wheels 6, 6 is high, the difference ΔN$_{10}$ in speed of rotation between the input and output shafts 8, 10 of the viscous coupling 9 is smaller than the difference ΔN fr in speed of rotation between the front and rear wheels 3, 6.

Figure 3:
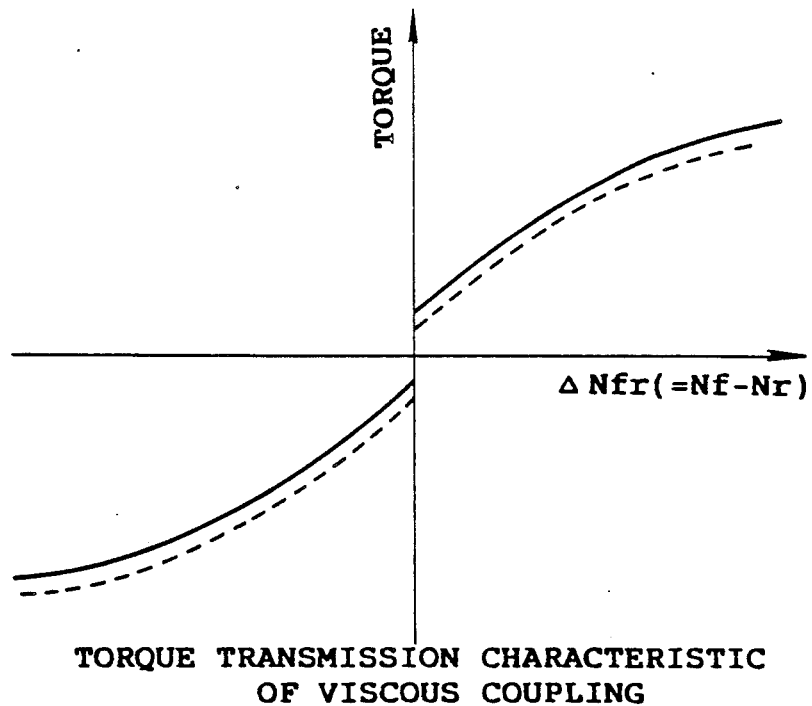
FIG. 3 is a graph of a torque transmitting characteristic of the viscous coupling employed in the four-wheel drive system of FIG. 1.

Due to this, the viscous coupling 9 has such a torque transmitting characteristic as shown by the solid lines in FIG. 3. That is, in the zone where the positive (the speed of rotation of the always driven front road wheels 3, 3 is higher than that of the rear wheels 6, 6) difference ΔN fr in speed of rotation between the front and rear wheels is caused, a higher torque transmitting characteristic is obtained for a given difference ΔN fr in speed of rotation between the front and rear wheels as compared with the dotted line characteristic representing the conventional relationship i t·i r=1. On the other hand, in the zone where the negative (the speed of rotation of the rear road wheels 6, 6 is higher than that of the front road wheels 3, 3) difference ΔN fr in speed of rotation between the front and rear wheels is caused, a lower torque transmitting characteristic is obtained for a given difference ΔN fr in speed of rotation between the front and rear wheels as compared with the dotted line characteristic representing the conventional relation of i t·i r=1. That is, the torque transmitting characteristic of this invention is obtained by displacing the parallel prior art dotted line characteristic representing i t·i r=1 (N i/N f=N o/N r) upwardly.

In the meantime, when the result of i t·i r is set to be considerably smaller than 1, the difference ΔN io in speed of rotation between the input and output shafts 8, 10 becomes so large even during coasting, resulting in an increased running resistance. For this reason, it is desirable to set the percentage by which the result of i t·i r is smaller than 1 is within a several percent (e.g. 5%).

Accordingly, in a slippery road surface condition, or a slip occurring running condition where a front wheel slip tends to occur, a rated driving force distribution to the rear wheels 6, 6, is increased resulting in an improved responsiveness for changing the mode of operation from the two-wheel drive to the four-wheel drive and thus making it possible to attain an excellent acceleration at starting, a reliable straight running stability, an improved driveability on a slippery road, etc.

Further, in case where the front wheels are in a condition tending to lock on braking, a braking torque to the rear wheels 6, 6, transmitted can be smaller than that to the front wheel 3, 3, whereby it becomes possible to prevent lock of the rear wheels on engine braking, while at the same time, it becomes possible to maintain a performance characteristic that the front wheels tend to lock on foot braking more easily than the rear wheels, thus improving the braking stability.

At this time, there is not any change in distribution of a drive torque to the rear wheels in dependence upon the difference ΔN fr in speed of rotation of the front and rear wheels, thus resulting in an improved braking efficiency.

From the foregoing, it will be understood that the four-wheel drive system of this invention can produce the following effects:

(1) Since one of or both of the gear ratios of the speed-up mechanism 7 and the rear differential 11 are set so as to satisfy the relation of 1>i r·i t, it becomes possible to attain an excellent acceleration efficiency at starting, a reliable straight running stability and an improved driveability on a slippery road and at the same time makes it possible to prevent the rear wheels from locking on braking even when the braking tends to cause lock of the front wheels and thus improve the braking stability.

(2) It is set so that the result of the speed N i of rotation of the viscous coupling input shaft divided by the speed N f of rotation of the front wheels is larger than the result of the speed N o of rotation of the viscous coupling output shaft divided by the speed N r of rotation of the rear wheel by designing the gear ratios of the conventional gear parts, it becomes possible to attain the effect (1) without increasing the number of parts and complicating the structure.

While the invention has been described and shown as above, it is not for the purpose of limitation. For example, while the embodiment has been described and shown as attaining the drive system by changing or modifying the gear ratios of the conventional gears, an additional gear or gears may be employed to this end and in such a case $$N_i/N_f = N_o/N_r \text{ or}$$
$$N_i/N_f > N_o/N_r$$

may be selected depending on the desire or on the object.

What is claimed is:

1. A four-wheel drive system comprising:
   a power unit; and
   means for transmitting power from said power unit to a set of front wheels through a drive line having mechanically engaged drive elements and to a set of rear wheels though a drive line having a viscous coupling and mechanically engaged drive elements;
   wherein said mechanically engaged drive elements of said drive line for the front wheels and said mechanically engaged drive elements of said drive line for the rear wheels have a set relationship that the ratio of rotating speed of said input shaft of said viscous coupling to the rotating speed of the front wheels is larger than the ratio of rotating speed of said output shaft of said viscous coupling to the rotating speed of the rear wheels.

2. A four-wheel drive system for a vehicle having a set of front wheels and a set of rear wheels, comprising:
   an engine;
   a first drive train mechanically engageable for transmitting a driving force from said engine to the front wheels; and
   a second drive train having a viscous coupling and cooperative with said first drive train for transmitting a driving force from said engine to the rear wheels;
   said viscous coupling having an input shaft and an output shaft;
   said first and second drive trains having a set relationship that a ratio of rotating speed of said input shaft to the rotating speed of the front wheels is larger than the ratio of rotating speed of said output shaft to the rotating speed of the rear wheels.

3. A four-wheel drive system as set forth in claim 2, wherein said second drive train comprises a speed-up mechanism and a rear differential having respective gear ratios for determining said relationship.

4. A four-wheel drive system as set forth in claim 3 wherein said second drive train satisfies the relationship $1 > i_r \cdot i_t$, where $i_r$ is the gear ratio of said rear differential and $i_t$ is the gear ratio of said speed-up mechanism.

* * * * *